United States Patent

[11] 3,568,020

[72] Inventor Edward L. Lisi
 Freeport, N.Y.
[21] Appl. No. 775,782
[22] Filed Nov. 14, 1968
[45] Patented Mar. 2, 1971
[73] Assignee Forney Engineering Company
 Dallax, Tex.

[54] SOLID STATE SWITCH PROTECTED THREE PHASE MOTOR REVERSING STARTER
 4 Claims, 3 Drawing Figs.
[52] U.S. Cl........................................................ 318/207,
 318/227
[51] Int. Cl......................................................... H02p 1/40
[50] Field of Search.......................................... 318/206,
 207, 227

[56] References Cited
UNITED STATES PATENTS
3,253,202  5/1966  Cotton ........................ 318/227
3,309,593  3/1967  Egglestone et al............ 318/227X Primary Examiner—Oris L. Rader
Assistant Examiner—Gene Z. Rubinson
Attorneys—Constantine A. Michaelos, John Maier, III and Marvin A. Naigur ABSTRACT: A reversing starter for an AC motor energized by a three phase current supply system in which two phases are reversed to reverse rotation of the motor by a solid state circuit responsive to forward and reverse commands. The starter is controlled by a novel protective solid state logic circuit which assures safe operation by preventing the passage of a selected command signal when the other command signal is present; as well as when such other command signal has been present within a fixed time period prior to the application of the selected command signal.

INVENTOR.
EDWARD L. LISI

BY

BARNWELL R. KING
ATTORNEY

SOLID STATE SWITCH PROTECTED THREE PHASE MOTOR REVERSING STARTER

BACKGROUND OF THE INVENTION

This invention relates to control circuits for three phase motors, whereby the motor is caused to rotate in a desired direction, clockwise or counterclockwise, by solid state circuitry in which two phases are reversed to reverse its direction of rotation. More particularly the invention is concerned with a novel protective solid state logic circuit for assuring safe operation of the reversing starter.

Proposals in the past for reversing three phase line starters were subject to serious short circuiting during switching. For example, it has been proposed (by Egglestone et al., U.S. Pat. No. 3,309,593, dated Mar. 14, 1967) to use solid state circuitry employing silicon controlled rectifiers but in such case when two silicon controlled rectifiers are conducting, and their gate signal is removed, such silicon controlled rectifiers will continue to conduct until the current through them crosses zero; but if during this time two other silicon controlled rectifiers are triggered to reverse the motor, a serious short circuit will result. Thus, destruction of the silicon controlled rectifiers takes place unless special fuses are used, requiring frequent and undesirable replacement. The same trouble is present when gas-filled tubes are employed, such as in the proposal of Pettit et al., U.S. Pat. No. 3,108,215 dated Oct. 22, 1963.

SUMMARY OF THE INVENTION

In accordance with an illustrative embodiment demonstrating features and advantages of the present invention, there is provided a reversing starter for an alternating-current motor adapted to be energized by a three phase power supply system, containing a solid state alternating-current switching circuit operative in response to a directional command signal to control two of the phases of such system to cause rotation of the motor in the selected direction. A novel protective solid state logic circuit controls the switching circuit. Such novel circuit comprises at least two logic gates, one for controlling the passage of a forward command signal, and the other for controlling the passage of the reverse command signal. Signal input means are provided for applying a selected command signal to the corresponding gate. Signal output means are also provided for controlling the operation of the solid state alternating current circuit to cause the motor to rotate in the desired direction according to the command signal passed by the gate corresponding to the selected command signal.

Circuit means are associated with the gates which act to prevent passage of the selected command signal through the corresponding gate when the other command signal is present, as well as when such signal has been present within a certain length of time prior to the application of the selected command signal. Safe operation of the solid state alternating current switching circuit is assured by preselecting a time delay sufficient for such operation.

The gates are preferably selected from the class consisting of NOR, AND, NAND, and OR gates, and the solid state alternating current switching circuit includes a network of solid state devices, and a plurality of relay switches associated therewith for selectively gating the devices, and the logic circuit includes a relay coil for operating the switches according to the selected command signal passed by the corresponding gate.

The solid state devices are preferably selected from the class consisting of bidirectional thyristors or unidirectional thyristors. Each of the gates is preferably a NOR type circuit with an NPN transistor connected across a direct-current power supply. A circuit including a transistor is provided for connecting the coil across the direct current power supply, as well as a circuit for turning on the transistor when the NPN transistor is turned off.

The invention involves two basic electronic circuits. Together they provide the capability of delivering three phase output power, more reliably and economically than previously attainable.

The first circuit accepts forward or reverse motor commands, and through a series of logical decisions, determines if the commands should be passed on to the final control circuit. The control level is 12 volts DC for example, and is coupled to a high voltage three phase circuit by suitable input-output isolating devices. Optical coupling, transformer coupling, magnetic coupling, etc., are also suitable since they provide isolation of control and power circuits. In the present case, however, coupling is by means of high reliability computer grade miniature relays.

The second circuit comprises power semiconductors and filtering components that block the high three phase line voltage from the three phase control motor. On command from the control circuitry (first circuit described above), the proper semiconductors are gated to provide either clockwise or counterclockwise rotation of the motor. Short circuiting is eliminated and the life of the starter is substantially unlimited.

BRIEF DESCRIPTION OF THE DRAWINGS

The above brief description, as well as further objects, features, and advantages of the present invention will be more fully appreciated by reference to the following detailed description of a presently preferred but nonetheless illustrative embodiments in accordance with the present invention when taken in connection with the accompanying drawings wherein.

DESCRIPTION OF THE PREFERRED EMBODIMENTS

Figure 1:
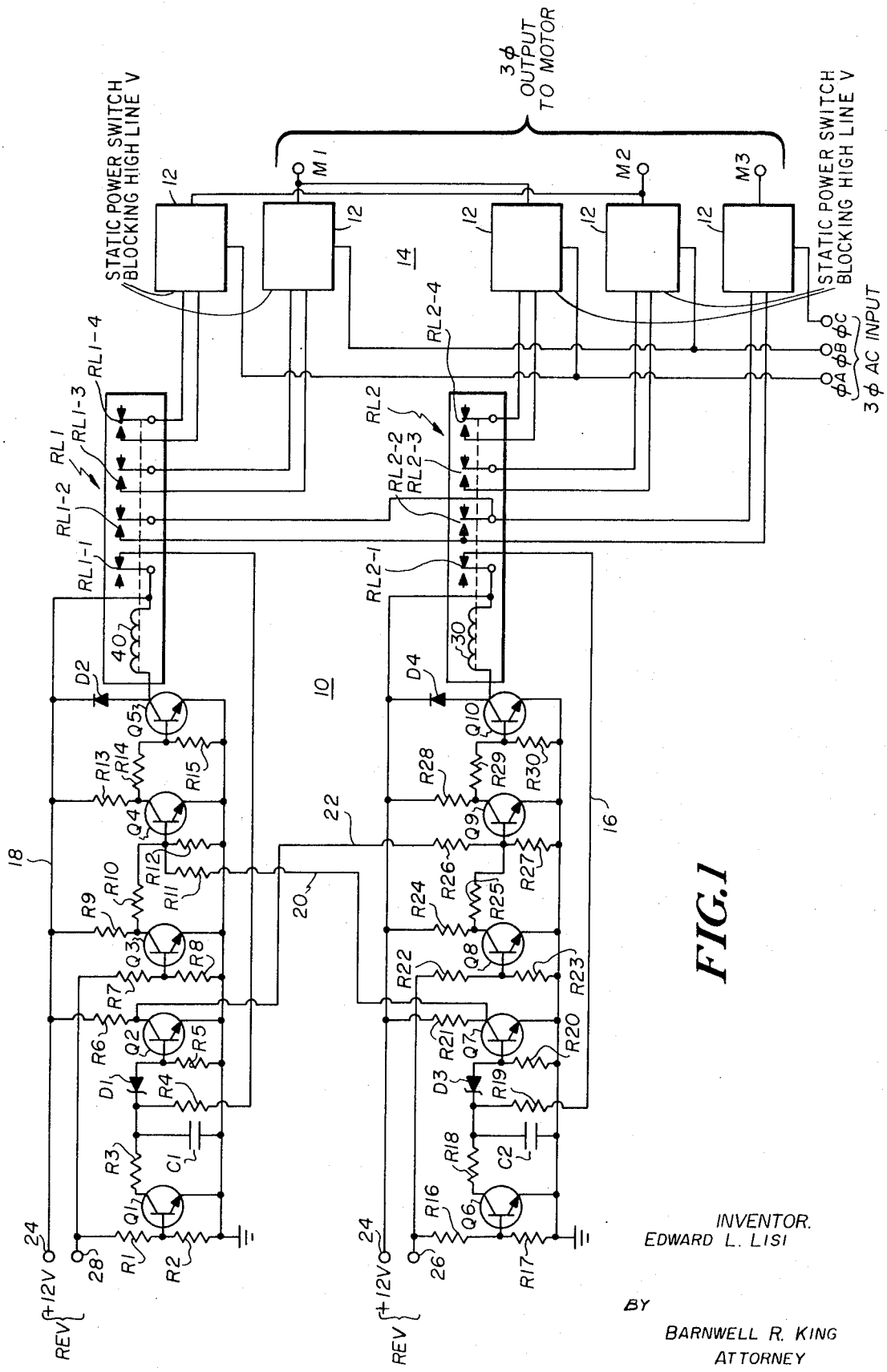
FIG 1 is a circuit diagram illustrative of the invention.

In FIG 1 the circuit 10 to the left of relays RL1 and RL2 provides the logic which assures safe operation of the static power switches 12 of power switching circuit 14 to the right of such relays. Relays RL1 and RL2 couple the low level logic signal to high voltage static power switching circuit 14. In this embodiment, while relays are used for such coupling, as pointed out above, other suitable types of coupling might be used, such as optical, magnetic, transformer, and the like.

Figure 2:
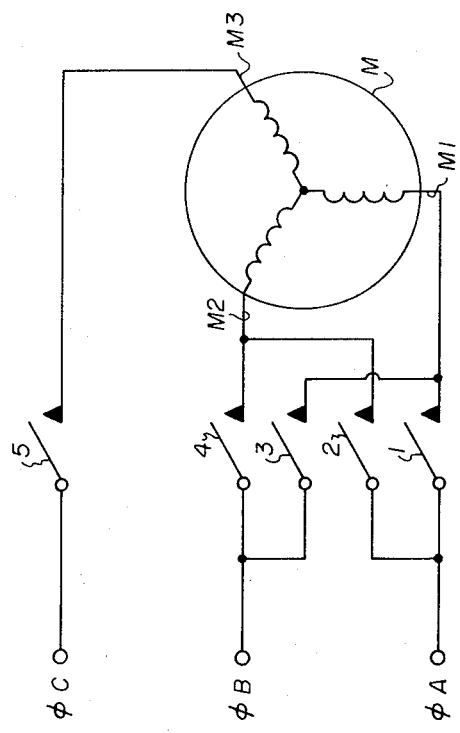
FIG 2 is a simplified circuit diagram.

To reverse a three phase motor, two of the phases ΦA, ΦB, and ΦC must be interchanged with respect to corresponding terminals (M1, M2, and M3) of the motor. As shown in FIG 2 closing switches 1, 4, and 5 causes the motor M to run in one direction, energized by three-phase power. To reverse such motor switches 2, 3, and 5 are closed. Actually, the motor M could be operated in either direction and stopped with switch 5 in phase ΦC, closed at all times. But in that case, if any one switch failed to open, the motor M would continue to run. By switching phase ΦC on and off at least two switches have to fail before it becomes impossible to stop the motor M.

Figure 3:
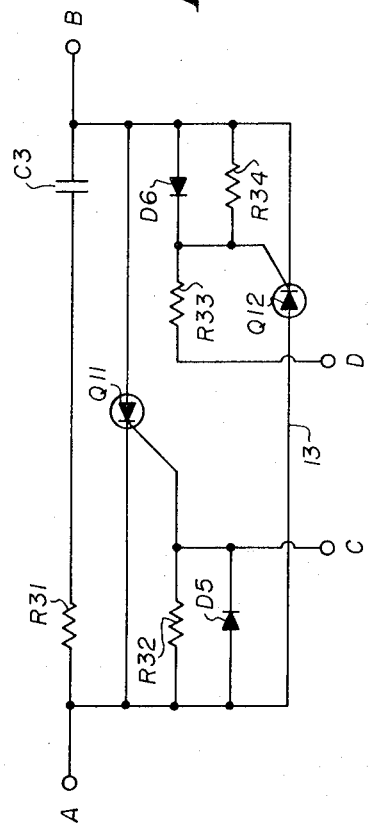
FIG 3 is a circuit diagram of a static power switch which can be employed in the circuit of the invention.

The type of static power switch 12 used in circuit 14 of the solid state reversing starter is shown in circuit 13, in FIG 3. The circuit 13 passes alternating current from terminal A to terminal B when terminal C is connected to terminal D. If terminal A is positive with respect to terminal B, current will flow through diode D5 terminal C to terminal D, through resistor R33 and into the gate of silicon controlled rectifier Q12. This will turn on silicon controlled rectifier Q12 so that it conducts current from terminal A to terminal B. When terminal B becomes positive with respect to terminal A, however, current flows through diode D6, resistor R33, terminal D to terminal C, and into the gate of silicon controlled rectifier Q11. This turns on silicon controlled rectifier Q11 and it conducts current from terminal B to terminal A. Thus, by merely connecting terminal C to terminal D circuit 13 will pass alternating current, i.e., current from terminal A to terminal B, or from terminal B to terminal A.

Resistor R31 and capacitor C3 provide dv/dt protection for silicon controlled rectifiers Q11 and Q12.

In FIG 3, the resistor R31 preferably has a resistance value of 10 ohms; resistor R32:1K; and resistor R33 330 ohms. Diodes D5 and D6 have a rating of 100 PIV, each; and silicon controlled rectifiers Q11 and Q12 are selected according to the current and voltage requirements of the motor being controlled.

In the circuit of FIG 1, five of the static power switches 12 comprising switching circuits 13 are connected to perform the five switching functions shown in FIG 2. The relays RL1 and RL2 are operated to make the terminal C to terminal D connection of FIG 3. Relay RL1, for example, controls the static switching circuits 13, FIG 3, of switches 12, FIG 1, equivalent to switches 2, 3, and 5 of FIG 2, causing the motor M to run backwards. Relay RL2, on the other hand, controls switches 12 corresponding to switches 1, 4, and 5, FIG 1, causing the motor M to run forward. The circuit of FIG 3 can be replaced by any number of circuits known in the art, such as a bidirectional thyristor or a diode bridge together with a thyristor.

The relays RL1 and RL2 are controlled by a logic circuit 10 comprising a "forward" section 16 and a "reverse" section 18, linked by conductors 20 and 22. Each section is connected across a voltage supply terminal 24. The logic circuit 10 receives an input command signal for either forward or reverse rotation of the motor M, at terminal 28 or terminal 26, respectively, and decides whether it is safe to pass the command on to the relays RL1 and RL2 which, in turn, control static power switches 12.

Each section 16, 18 contains five transistors of the NPN silicon type, identified at Q1, Q2, Q3, Q4 and Q5 in section 18; and Q6, Q7, Q8, Q9 and Q10 in section 16. The resistors R1, R7, R11, R14, R16, R22, R25, R26, and R29 preferably have a resistance rating of 5.6K each. The rating of resistors R3, R6, R10, R13, R18, R21, R24 and R28 preferably is 3.3K each. That of each resistor R2, R5, R8, R12, R15, R17, R20, R23, R27 and R30 is 1K. Finally, each of the resistors R4 and R19 is rated at 10K resistance.

The capacitors C1 and C2 are rated at 2.2 mfd. each; while the diodes D1 and D3 are of the Zener type with a rating of 4.7 volts each; and diodes D2 and D4 are rated at 60 v. PIV. Such elements are connected as shown in FIG 1 to the coils 40 and 30 of relays RL1 and RL2 respectively.

In the following description of the logic circuit 10, FIG 1, the terms logical 1 and logical 0 are used. Whenever any transistor in this circuit has one or more logical 1's at its input it will be turned on and its output will be a logical 0. If all its inputs are logical 0's it will be cut off and its output will be a logical 1.

Assume for the moment that there is no "Fwd" signal present, then transistor Q8, section 16, is not gated, causing its output to become a logical 1. This output of transistor Q8 gates transistor Q9, making its output a logical 0. The output of transistor Q9 is used to gate transistor Q10. However, with a logical 0 as the output of transistor Q9, transistor Q10 is not turned on, hence relay coil 30 of RL2 remains deenergized. With relay coil 30 of relay RL2 deenergized, contacts RL2-1 remain in the normally closed position, thereby providing a logical 1 at the gate of transistor Q7. With a logical 1 existing at the gate of transistor Q7, its output becomes a logical 0, hence, at any time there is no "Fwd" signal, a logical 0 will appear, through conductor 20, as one of the inputs into transistor Q4. Conversely with no "Rev" signal present, the output of transistor Q2 will also be a logical zero, and will appear via conductor 22 as one of the inputs to transistor Q9.

In order to operate the starter to control the energization of motor M in either the forward or reverse direction, two logical 0 inputs must be at either transistor Q9 or transistor Q4 respectively. It is apparent, therefore, that transistor Q7 and transistor Q2 provide the necessary electrical interlocks through conductors 20 and 22, between forward and reverse operation.

As an example of such operation of the logic circuit 10 of the invention, assume it is selected to operate in the "Fwd" direction. To obtain such mode of operation, a logical 1 would have to be fed into the gate of transistor Q6 and transistor Q8 simultaneously through the "Fwd" connector. A logical 1 at the gate of transistor Q6 turns it on, causing a logical 0 to appear at the gate of transistor Q7. A logical 0 at the gate of transistor Q7 would turn it off, causing a logical 1 to appear at the gate of transistor Q4, causing it to turn on, thus producing a logical 0 at transistor Q5, causing it to turn off. From FIG. 1, it is apparent that relay coil 20 of relay RL1 cannot be energized as long as transistor Q5 is turned off, thereby providing the necessary electrical interlocking described above.

With the existence of the "Fwd" signal, the logical 1 appearing at the gate of transistor Q8 causes it to turn on, providing a logical 0 at its output, and hence, the second logical 0 required at the input of transistor Q9 in order to turn it off (recalling from the description of the operation given above that the other logical 0 appearing at the input to transistor Q9 came from transistor Q2 in the "Rev" section 18 of the logic circuit 10). With transistor Q9 turned off, a logical 1 would appear at the gate of transistor Q10, turning it on, hence energizing coil 30 of relay RL2, thereby providing the closure of contacts RL2-2, RL2-3, and RL2-4 to obtain "Fwd" operation. "Rev" operation is similar, and provides similar closure of contacts RL1-2, RL1-3, and RL1-4.

The invention provides a time delay network in the gates of both transistor Q7 and transistor Q2. The purpose of such time delay is to prevent one set of static power switches 12 from being energized before the other set is completely turned off. This is an important novel feature of the present invention.

As described above, to be able to energize relay RL1 for reverse operation the input to transistor Q4 from transistor Q7 must be a logical 0. But as long as relay RL2 is energized, contact RL2-1 is open and transistor Q6 is turned on. This makes the input to transistor Q7 a logical 0 and therefore, its output will be a logical 1, making it impossible for coil 40 of relay RL1 to be energized. But even when relay RL2 is deenergized the input to transistor Q7 remains a logical 0 until the capacitor C2 charges up through resistor R19 to the logical 1 level. This delay is preselected to provide the time necessary for the static power switches 12 for the forward direction to turn off before those for the reverse direction can be turned on. The capacitor C1 and the resistor R4 perform a similar function for the reverse direction.

This delay is provided because the static power switches 12 do not turn off when their respective relay is deenergized, but only when the alternating current through them approaches zero. Without this delay it would be possible for the relay in one direction to be deenergized and the relay in the other direction to be energized while the static power switches 12 in the original direction were still conducting. This is undesirable because as can be seen from FIG. 2, if both sets of power switches conduct at the same time, a direct short across phase ΦA and phase ΦB of the alternating current power line results.

A latitude of modification, change and substitution is intended in the foregoing disclosure and in some instances some features of the invention will be employed with a corresponding use of other features. Accordingly, it is appropriate that the appended claims be construed broadly and in a manner consistent with the spirit and scope of the invention herein.

I claim:
1. A reversing starter for an AC motor adapted to be energized by a three phase current supply system comprising in combination:
    a solid state AC switching circuit operative in response to a directional command signal to control two of the phases of such system to cause rotation of the motor in the selected direction;
    a protective solid state logic circuit for controlling said switching circuit, including at least two logic gates, one for controlling the passage of a forward command signal, and the other for controlling the passage of the reverse command signal;

signal input means for applying a selected command signal to the corresponding gate;

signal output means for controlling the operation of said solid state AC circuit to cause said motor to rotate in the selected direction according to the command signal passed by the gate corresponding to the selected command signal;

circuit means associated with said gates which act to prevent passage of the selected command signal through the corresponding gate when the other command signal is present, as well as when such signal had been present within a certain length of time prior to the application of the selected command signal thus assuring safe operation of the solid state AC switching circuit by providing a time delay sufficient for such operation; and said solid state AC switching circuit including a network of solid state devices, and a plurality of relay switches associated therewith for selectively gating said devices, and said logic circuit including an input-output isolating means for operating said switches according to the selected command signal passed by the corresponding gate.

2. A reversing starter as defined by claim 1, in which said input-output isolating means comprises electromagnetic coupling.

3. A reversing starter as defined by claim 1, in which said input-output isolating means comprises a relay coil.

4. A reversing starter as defined by claim 3, in which:

each of said gates is a NOR type circuit with an NPN transistor connected across a DC power supply;

a circuit including a transistor for connecting said relay coil across said DC supply; and a circuit for turning on said transistor when said NPN transistor is turned off.